Oct. 10, 1967    J. J. PLESCIA    3,346,714
LAMP BASE TERMINAL WELDING APPARATUS
Filed Oct. 11, 1963    2 Sheets-Sheet 1
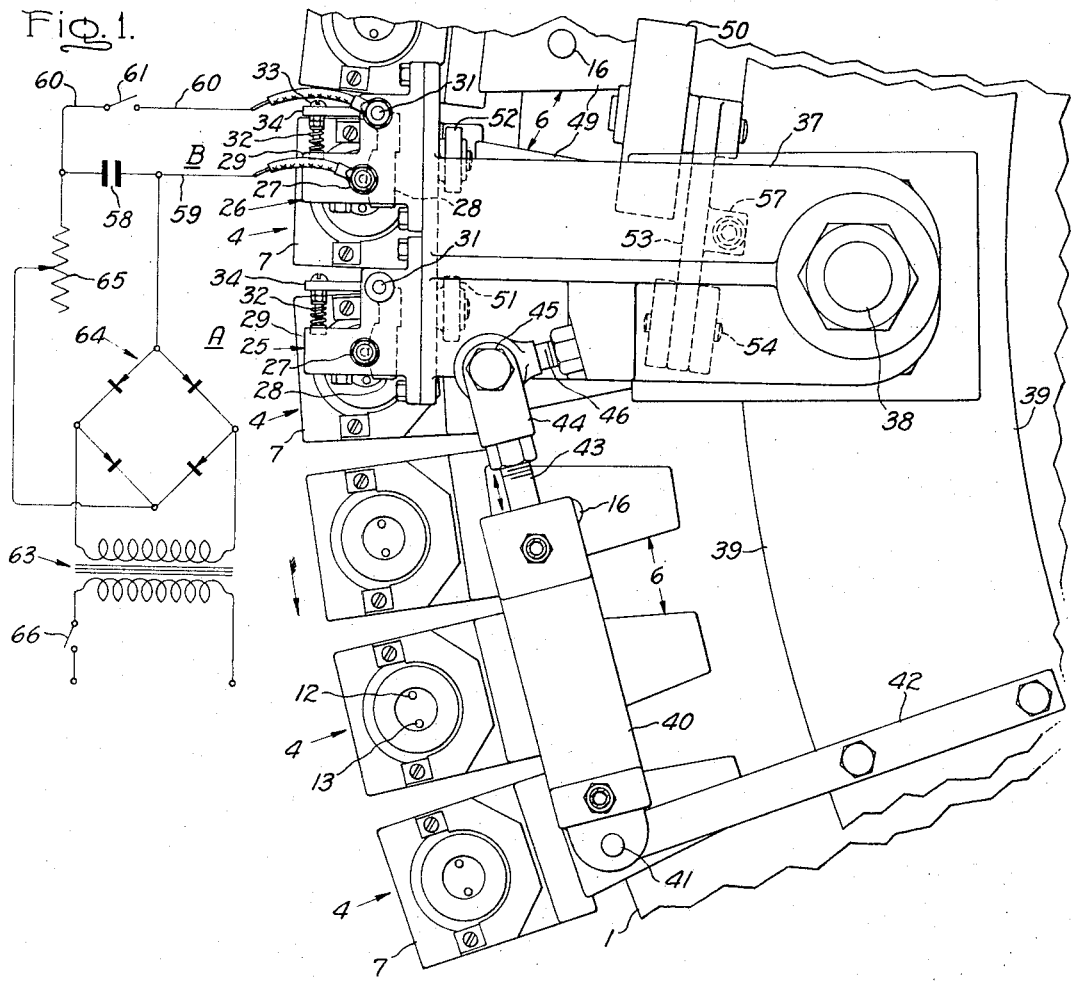
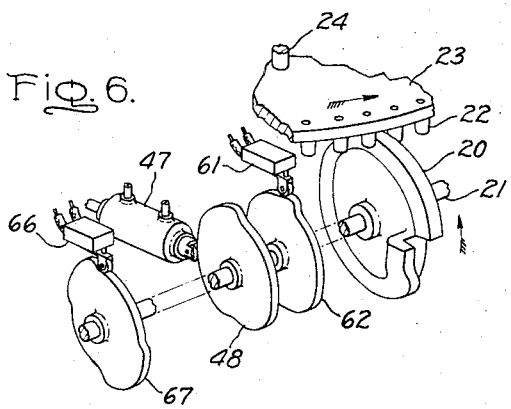
Inventor:
Joseph J. Plescia
by Otto Tichy
His Attorney

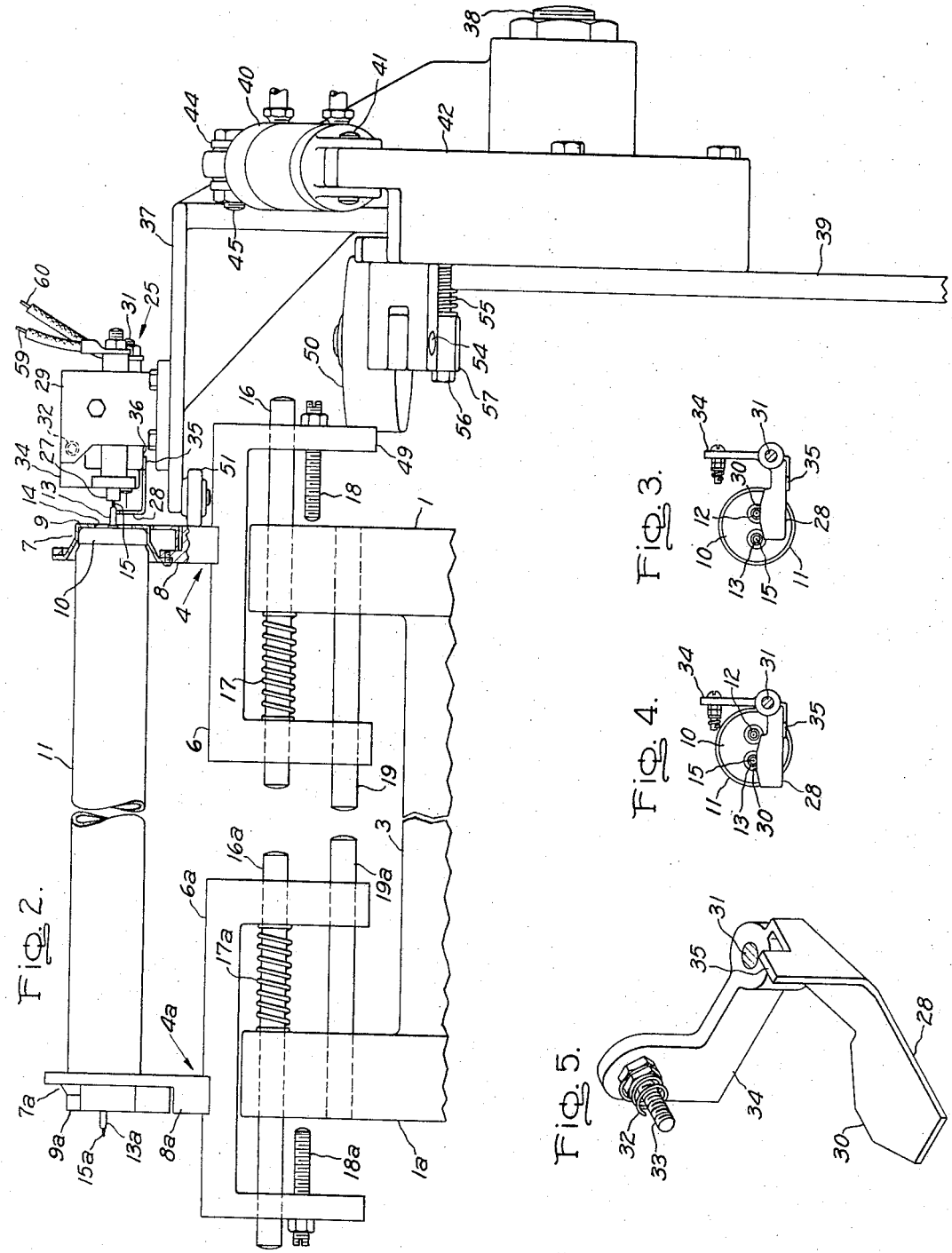

United States Patent Office 3,346,714
Patented Oct. 10, 1967

3,346,714
LAMP BASE TERMINAL WELDING APPARATUS
Joseph J. Plescia, Euclid, Ohio, assignor to General Electric Company, a corporation of New York
Filed Oct. 11, 1963, Ser. No. 315,609
2 Claims. (Cl. 219—80)

ABSTRACT OF THE DISCLOSURE

In a machine for welding together respective lead wires and associated lamp base pins, a single welding head at one station of a rotary turret having adjustable lamp holders on heads carrying the lamps with the bases attached thereto is arranged so that the welding head oscillates to carry an electrode and grounding contact from welding relation with one pin where a welding arc is struck to welding relation with the other pin where a second arc is struck, to thereby weld both pins during the dwell of the lamp-carrying head at the one station. A gauging roller is provided to be engaged by the lamp holder for correctly spacing a base pin from the welding electrode. The gauging roller is mounted in fixed relation to the welding head and oscillates with it while maintaining engagement with the lamp holder during the oscillation.

---

This invention relates to electric lamp making equipment generally, more particularly to lamp basing, and still more particularly to the welding of lamp base pins and lead wires.

It is an object of the invention to provide a relatively simple and inexpensive arrangement for welding, at one station of an indexing carrier or turret, both of a pair of pins extending from the base of a lamp such as the well-known bipin fluorescent lamps.

It has been the practice heretofore to provide a welding head at each of two successive stations arranged to weld one of the two pins at each station. For several reasons, including limitations of space, it is not entirely feasible to provide both welding heads at a single station. In any event, either arrangement requires a duplication of the welding equipment, including the necessary circuitry, with attendant increased initial cost and maintainence. In accordance with the invention, the disadvantages of such duplication are obviated by arranging a single welding head for oscillation to carry it from a position in operative relationship with one of the pins to operative relationship with the other pin, with provision for operating the welding circuit to strike an arc at each position of the head, these operations taking place during the dwell period of the indexing carrier. Another feature is an improved lamp supporting arrangement including means for adjusting the position of the lamp in predetermined spaced relationship with the welding electrodes.

Further features and advantages of the invention will appear from the following description of species thereof and from the drawing wherein:

FIG. 1 is a fragmentary elevation of a lamp basing machine showing a portion of one of a pair of turret wheels which are rotatable on a horizontal axis, and a welding mechanism associated therewith, as well as a showing of a welding circuit;

FIG. 2 is a fragmentary plan view, looking upward, of the basing machine and associated welding mechanism;

FIGS. 3 and 4 are end views of a lamp and base with a showing of a grounding lug or contact of the welding mechanism in operative relationship to respective pins of the lamp base;

FIG. 5 is a perspective view of the grounding lug or contact; and

FIG. 6 is a perspective view of a cam shaft of the machine.

Referring to FIGS. 1 and 2 of the drawing, the machine comprises a pair of horizontally spaced turret wheels 1 and 1a interconnected by a cylindrical hub 3 and mounted for rotation on a horizontal shaft (not shown). Each of the turret wheels carries at its periphery a pluraliy of cooperating lamp holding heads 4 and 4a. Each head comprises a bracket 6 or 6a which carries a combined holder and oven member 7 or 7a comprising a plate portion 8 or 8a which is attached to the associated bracket 6 or 6a, and a cylindrical sheet metal cup portion 9 or 9a in which is received the shallow base shell 10 or 10a of the elongated tubular fluorescent lamp 11. The hollow pins 12 and 13 (or 12a and 13a) which are insulated from each other and from the associated base shell 10 or 10a extend outwardly through a central opening 14 in the associated cup 9 or 9a, and a lead wire 15 extends through each of the pins. The holder and oven member 7 or 7a also includes a baffle arrangement for confining the heat of gas burners around the periphery of the cup portion 9 anr 9a to bake the cement in the base 10 or 10a, all as more fully described and claimed in my copending application Ser. No. 123,561, filed July 12, 1961, now Patent No. 3,188,064, dated June 8, 1965, and assigned to the same assignee as the present invention.

The cooperating brackets 6 and 6a and holders 7 and 7a are based toward each other to firmly clamp the lamp 11 therebetween. To that end, each bracket 6 and 6a is slidably mounted on a pin 16 or 16a having thereon a spring 17 or 17a located between one leg of the bracket and the inner face of the turret wheel 1 or 1a to thereby bias the bracket in a direction inwardly of the turret wheels and parallel to the axis of rotation of the wheels. In the absence of a lamp 11, each bracket 6 or 6a is normally held by the spring 17 or 17a with its stop screw 18 or 18a against the turret wheel 1 or 1a. The brackets 6 and 6a are moved outwardly of the turret wheels to receive the lamp between the holders 7 and 7a. Rotation of the bracket 6 or 6a about the pin 16 or 16a is prveneted in any suitable manner, as by a second pin 19 or 19a affixed to the turret wheel 1 or 1a and extending through an opening in one or both legs of the bracket.

The turret wheels 1 and 1a are indexed by any suitable mechanism such as a conventional barrel cam 20 (FIG. 6) which is mounted on a cam shaft 21 and which engages pins 22 at the periphery of a spider 23 on a shaft 24 which is suitably connected to the horizontal shaft (not shown) which carries the turret wheels 1 and 1a. In this case, the cam 20 indexes the turret wheels 1 and 1a an angular distance spanning two heads 4 so that the heads are indexed two at a time to the various work stations around the turret, with a suitable dwell period between indexing movements. Accordingly, there are provided two like welding heads 25 and 26 (FIG. 1) at stations A and B for simultaneously welding the pins in two adjacent lamp holder heads 4 during one index of the turret.

Each of the welding heads 25 and 26 comprises a stationary electrode 27 and a movable grounding lug or contact 28 (FIGS. 3 to 5) mounted in a large block 29 of insulating material such as Teflon. The electrode 27 is arranged to be in axial alignment with a base pin 12. Upon indexing of a lamp into a welding station, the contact 28 is arranged to engage the side of the said pin 12. The contact 28 has a cam shaped edge with a raised central portion 30 (FIG. 3) and sloping end portions for engaging one pin 12 while remaining out of engagement with the other pin 13. The contact 28 is mounted for pivotal movement on a pin 31 in the block 29 and is spring-biased in any suitable manner, for example, by a helical spring 32 (FIG. 1) which has one end seated in a well in the insulating block 29 and which surrounds a stud 33 which is attached to the end of an arm 34 extending from the contact member 28. Rotation (clockwise in FIG. 1) of the contact lug 28 by the spring 32 is limited by engagement of a stop portion 35 of the contact 38 with a surface 36 (FIG. 2) of the block 29.

In accordance with the invention, the insulating blocks 29 of both welding heads 25 and 26 are mounted on the free end of an angle arm 37 the other end of which is mounted for pivotal movement on a pin or shaft 38 supported from a frame member 39 at the outer side of the turret wheel 1. The said arm 37 supports the welding heads 25 and 26 for oscillation to carry the electrode 27 and grounding contact 28 of each head from welding relationship with one pin 12 (FIG. 3) to welding relationship with the other pin 13 (FIG. 4) of the same lamp base 10.

The oscillation of the arm 37 is effected by a hydraulic cylinder 40 which is pivoted at one end on a pin 41 in a bracket 42 on the frame member 39. The piston (not shown) in cylinder 40 is connected to a rod 43 having at its end a yoke 44 pivotally connected by pin 45 to a stud 46 extending from the arm 37. The actuation of the hydraulic cylinder is controlled by a hydraulic valve 47 (FIG. 6) under the influence of a cam 48 on the shaft 21.

The lamp base pins 12 and 13 (and the leads 15 projecting therefrom) are located at a predetermined distance from the electrode 27 by controlling the location of the lamp holder heads 4 and 4a. As illustrated herein, as the heads 4 approach the welding stations A and B, the outer leg 49 of the bracket portion 6 of the head is engaged by a wheel or roller member 50 to shift the bracket 6 to the left in FIG. 2 (along with the bracket 6a in the cooperating head 4a) to move the lamp 11 in a direction away from the electrode 27. As the bracket 6 of head 4 moves away from contact with the wheel 50 into station B, the heads 4 and 4a and lamp 11 move to the right under the influence of springs 17 and 17a until a portion of the lamp holder member 8 of the leading head 4 engages a gauging roller 52 mounted on the arm 37. Upon further movement of the said leading head 4 to station A, the lamp holder 8 leaves roller 52 as it engages roller 51. Similarly, the trailing head 4 is shifted by the wheel 50 and then moved back to bring its lamp holder 8 into engagement with roller 52. The lamp 11 in each of the heads at stations A and B is thus located with its pin 12 a predetermined distance from the associated electrode 27.

The wheel 50 is mounted on one end of an arm 53 which is pivoted at its other end on a pin 54 in a bracket which is supported from the stationary frame 39. The wheel 50 is biased to the left in FIG. 2 by a spring 55 which surrounds a lug or bolt 56 which extends through on offset boss 57 on the arm 53 and which is anchored in a member attached to the frame 39. The spring 55 normally holds the boss 57 on arm 53 against the head of the bolt 56 with sufficient force to move the heads 4 and 5 to the left (FIG. 2) and off the "on center" position they occupy when the lamp is in place between heads 4 and 4a.

The welding current is supplied by any suitable type of circuit connected to each of the welding heads 25 and 26. In FIG. 1 there is shown, by way of example, a circuit associated with the head 26 and comprising a capacitor 58 which is connected by conductors 59 and 60 to the electrode 27 and grounding lug 28, respectively, the latter connection being through the pin 31. The capacitor 58 is discharged upon closing of a switch 61 in the line 60 and which is controlled by a cam 62 (FIG. 6) on the shaft 21. The capacitor 58 is charged by a transformer 63 the secondary of which is connected across the capacitor through a full wave rectifier 64 and variable resistor 65. The primary of the transformer is connected to a suitable alternating current power supply through a switch 66 which is under the control of a cam 67 (FIG. 6) on the shaft 21. Similar circuitry and cams are provided for the welding head 25.

In operation, as a pair of lamp holder heads 4 are indexed into the welding stations A and B, the leading head 4 (and also the cooperating head 4a, as well as the lamp 11) is shifted to the left in FIG. 2 by engagement of the arm 49 of bracket 6 with the wheel 50, so that the stop screw 18 on said bracket arm 49 engages the turret wheel 1 and the lamp holder 8 is spaced to the left of the roller 52. As the said leading head 4 passes from contact with the wheel 50, the heads 4 and 4a and lamp 11 are moved back toward the right in FIG. 2 by spring 17a in the head 4a to bring the lamp holder 8 against the roller 52. Upon continuation of the indexing motion, the said lamp holder 8 of the leading head 4 leaves the gauging roller 52 as it comes into engagement with gauging roller 51 at station A. At the same time, the trailing head 4 leaves the wheel 50 and is similarly moved to bring its lamp holder 8 into engagement with the gauging roller 52 at station B. The lamps 11 at stations A and B are thereby positioned with their base pins 12 a predetermined distance from the electrodes 27 of the respective welding heads 25 and 26. During the indexing motion, the capacitor 58 is charged from transformer 63 by closing of the switch 66 by the cam 67 (FIG. 6), the switch 61 being at that time held open by cam 62. Upon arrival of the lamp at the welding station, the welding arc is initiated upon opening of the switch 61 by cam 62 to weld the lead wire 15 to the base pin 12. Then, still during the dwell period of the heads 4 at the stations A and B, the welding heads 25 and 26 are shifted by counter-clockwise (FIG. 1) pivotal movement of the arm 37 by cylinder 40 to shift the electrode 27 and grounding contact 28 from pin 12 (FIG. 3) to pin 13 (FIG. 4) of the same lamp 11. At the same time, the condenser 58 is recharged by closing switch 66 (and opening switch 61), followed by discharging of the condenser by closing switch 61 (and opening switch 66) to weld the second pin 13 to its enclosed lead wire 15. The turret wheels 1 and 1a are then indexed, and the welding heads 25 and 26 are retracted by cylinder 40, to repeat the cycle.

It will be evident that, for a double ended lamp as shown herein, a similar welding unit is provided adjacent the turret wheel 1a at a pair of welding stations following stations A and B for welding the pins 12a and 13a of the base at the other end of the lamp 11.

What I claim as new and desire to secure by Letters Patent of the United States is:

1. In a lamp basing machine, the combination of a carrier, holder means on said carrier for supporting a lamp having a base thereon with a pair of pins extending therefrom in parallel spaced relationship and lead wires extending through said pins, means to index said holder to successive stations with a dwell period at each station, welding means comprising a head portion at one of said stations carrying a grounding contact and an electrode, and a capacitor discharge welding circuit means connected to said contact and electrode, means mounting said lamp holder means on said carrier for biasing movement toward the said electrode at said one station, means effective upon indexing of the lamp holder means toward said one station to bias the holder means in a direction away from said electrode and to release said holder means upon arrival at said one station, and gauging means at said one station in the path of movement of the holder means toward said electrode and located to be engaged by said holder to space the pins of the lamp in said holder a predetermined distance from said electrode, means for oscillating said welding head to carry said contact and electrode from welding relationship with one pin of a lamp in a holder at said one station to welding relationship with the other pin during the dwell period of said holder at said one station, and means to effect sequential operations of said welding circuit to strike a welding arc while said contact and electrode are in welding relation with first one and then the other of said pins, and means mounting said gauging means in fixed relation to said welding head and for oscillation therewith while maintaining engagement with said lamp holder means during said oscillation.

2. In a lamp basing machine, the combination of a carrier comprising a pair of spaced turret wheels mounted for rotation together about a common axis, cooperating lamp holder means at the peripheries of said turret wheels for supporting therebetween an elongated tubular lamp having at each end a base with a pair of pins extending therefrom in parallel spaced relationship and lead wires extending through said pins, means resiliently biasing respective said holder means inwardly of the turret wheels and parallel to said common axis to clamp the lamp therebetween at its ends, means for indexing said turret wheels to carry said holders to successive stations with a dwell period at each station, welding means comprising a head portion located adjacent one of said turret wheels and at one of said stations carrying an electrode and a grounding contact, and a welding circuit means connected to said electrode and contact, movable support means mounting said welding head for oscillation to carry said electrode and contact from welding relationship with one of a pair of pins of the lamp in the holders at said one station to welding relationship with the other pin of said pair during the dwell period of the holders at said station, a gauging member mounted on said movable support means in fixed relation to said welding head and in the path of movement of the adjacent lamp holder parallel to said common turret wheel axis, means effective upon indexing of the lamp holders toward said one station to bias said holders in a direction away from asid electrode and to release said holders upon arrival at said one station for engagement of said adjacent lamp holder with said gauging member to thereby space the said pair of pins of the lamp in said holders a predetermined distance from said electrode, means for oscillating said movable support means to carry said welding electrode and contact as aforesaid from welding relationship with one pin to welding relationship with the other pin during the dwell period of the turret wheel while maintaining said gauging member in engagement with said adjacent lamp holder, and means to effect sequential operations of said welding circuit to strike a welding arc while said electrode and contact are in welding relation with first one and then the other of said pins.

References Cited

UNITED STATES PATENTS

| | | | |
|---|---|---|---|
| 1,767,521 | 6/1930 | Eksergian | 219—80 |
| 2,841,690 | 7/1958 | Kuebler | 219—100 |
| 2,892,923 | 6/1959 | Keubler | 219—113 X |

RICHARD M. WOOD, *Primary Examiner.*

R. F. STAUBLY, *Assistant Examiner.*